United States Patent [19]

Jones et al.

[11] 3,875,137

[45] Apr. 1, 1975

[54] N-SUBSTITUTED ASPACTYL PEPTIDE AMIDS

[75] Inventors: David A. Jones, Skokie; Robert H. Mazur, Deerfield, both of Ill.

[73] Assignee: G. D. Searle & Co., Chicago, Ill.

[22] Filed: Apr. 20, 1973

[21] Appl. No.: 352,865

[52] U.S. Cl. .............................. 260/112.5, 424/177
[51] Int. Cl. ..................... C07c 103/52, A61k 27/00
[58] Field of Search ................................ 260/112.5

[56] References Cited
UNITED STATES PATENTS

| 3,472,832 | 10/1969 | Bernardi et al. | 260/112.5 |
| 3,488,726 | 1/1970 | Ondetti et al. | 260/112.5 |
| 3,579,494 | 5/1971 | Ondetti et al. | 260/112.5 |
| 3,652,531 | 3/1972 | Miyoshi et al. | 260/112.5 |

OTHER PUBLICATIONS

Davey et al., J. Chem. Soc. (C), 1966, 555–66.
Pluscec et al.: J. Med. Chem., 13, 349–52 (1970).
Ondetti et al.: Digestive Diseases, 15, 149–56 (1970).

*Primary Examiner*—Elbert L. Roberts
*Assistant Examiner*—Reginald Suyat
*Attorney, Agent, or Firm*—Elliot N. Schubert; John A. Dhuey

[57] ABSTRACT

Peptides containing the residues of methionine and aspartic acid are prepared by standard coupling techniques and display valuable pharmacological, e.g. gastrin-inhibitory, properties.

13 Claims, No Drawings

N-SUBSTITUTED ASPACTYL PEPTIDE AMIDS

The present invention relates to novel peptide amides represented by the following structural formula

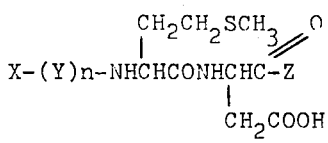

wherein X is hydrogen or a tertiary-butoxycarbonyl radical, Y is a tryptophanyl radical, $n$ is 0 or 1 and Z is the residue of an alkyl amine, cycloalkyl amine, heterocyclic amine or aralkyl amine.

The amine radicals encompassed in the foregoing structural formula are derived from alkyl amines, aralkyl amines, cycloalkyl amines and heterocyclic amines.

Typical of the alkyl amines contemplated are those wherein the alkyl radical contains 1 to 10 carbon atoms, e.g., methyl, ethyl, propyl, butyl, etc., and the branched-chain isomers corresponding.

The cycloalkylamines envisaged are, similarly, those wherein the hydrocarbon portion contains 1 to 10 carbon atoms. 1-Methylcyclohexylethylamine and 2-phenylcyclopropylamine are specific examples.

The aralkylamines denoted in that structural formula are typified by optionally substituted phenalkyl and phenoxyalkylamines, as exemplified by 1-methylphenethylamine, 1-methylphenoxyethylamine, 1,1-dimethylphenethylamine, 1-methyl-4'-fluorophenethylamine and 1-methyl-2-furylethylamine and by bicyclic amines such as 2-indanylamine.

Examples of heterocyclic amines, i.e. those containing a heterocyclic nitrogen atom, are tryptamine and 2-phenyl-3-methylmorpholine.

The compounds of the present invention are conveniently manufactured by a series of reactions involving the coupling of an aspartic acid amide of the type described by Mazur et al., J. Med. Chem., 13, 1217 (1970) with an N-protected methionyl active ester, removal of the N-protecting group with an appropriate acid such as trifluoroacetic or hydrochloric acid, coupling of the resulting methionylaspartyl amide with an N-protected tryptophane active ester and removal of the N-protecting group, by the procedure described hereinbefore, to afford the tryptophanyl methionyl aspartyl amides. An example of these procedures is the reaction of L-α-aspartyltryptamide with N-tertiary-butoxycarbonylmethionyl 2,4,5-trichlorophenyl ester in the presence of N-methylmorpholine to afford N-tertiary-butoxycarbonyl-L-methionyl-L-α-aspartyltryptamide and removal of the N-tertiary-butoxycarbonyl group by reaction with trifluoroacetic acid in acetic acid to afford L-methionyl-L-α-aspartyltryptamide. Reaction of the latter substance, in the form of the trifluoroacetate salt, with N-tertiary-butoxycarbonyl-L-tryptophane 2,4,5-trichlorophenyl ester to afford N-tertiary-butoxycarbonyl-L-tryptophanyl-L-methionyl-L-α-aspartyltryptamide followed by reaction of the latter substance with 80% aqueous trifluoroacetic acid in acetic acid, results in tryptophanyl-L-methionyl-L-α-aspartyltryptamide.

The compounds of the present invention are useful in consequence of their valuable pharmacological properties. They are, for example, gastric anti-secretory agents as evidenced by their ability to inhibit the gastric acid secretion induced by the administration of pentagastrin. The assay utilized for detection of that property is a modification of the procedure described by Ghosh and Schild, J. Physiol., Lond., 128:35–36P (1955); Br. J. Pharmacol. Chemother., 1300:54–61 (1958); and by Smith et al., Br. J. Pharmacol., 38:206–213 (1970). The details of that assay are as follows:

A group of male Charles River rats weighing 220–280 g. are anesthetized by the intramuscular administration of urethane at a dose of 1.5 g./kg. The trachea is exposed and cannulated and a polyethylene tube is passed through the esophagus into the cardiac junction of the stomach and is ligated in place in the neck, excluding the vagal nerves. The external jugular vein is exposed and cannulated to facilitate intravenous administration. The femoral artery is exposed and cannulated for recording of blood pressure. The abdomen is opened. A small glass cannula is passed through an incision in the duodenum gently into the stomach and secured by tying a ligature around the pyloric sphincter. A small longitudinal incision is made in the stomach, parallel to the greater curvature. The interior of the stomach is washed with warm saline until all food is evacuated. The incision is then closed with a continuous suture and the stomach is returned into the abdominal cavity. The body temperature is maintained at 30°C. by a rectal contact thermometer operating a 100 Watt lamp placed over the animal. The stomach is continuously perfused through the esophageal cannula with 1/4,000 N sodium hydroxide solution flowing at the rate of 1–2 ml./min. to maintain gastric effluent pH from the pyloric cannula at a value of 6.0 to 6.5. A direct recording pH meter is connected to the physiograph for the measurement of gastric pH. Pentagastrin, a stimulant of gastric acid secretion, is administered intravenously at a standard dose of 0.1 mcg./rat. The test compounds are evaluated for their ability to antagonize the secretory response induced by the administration of pentagastrin. A test compound is considered active if the standard pentagastrin response is blocked to the extent of at least 50%.

The invention will appear more fully from the examples which follow. These examples, however, are given by way of illustration only and are not to be construed as limiting the invention either in spirit or in scope as many modifications both in materials and methods will be apparent from these examples to those skilled in the art. In these examples temperatures are given in degrees Centigrade (°C.) and quantities of materials in parts by weight unless otherwise noted.

EXAMPLE 1

To a suspension consisting of 9.7 parts of L-α-aspartyltryptamide in 100 parts by volume of dimethylformamide is added 5.6 parts by volume of 6.17 M hydrogen chloride in dioxane to effect solution. To that solution is then added 16.5 parts of N-tertiary-butoxycarbonyl-methionyl 2,4,5-trichlorophenyl ester and 7.8 parts by volume of N-methylmorpholine. The reaction mixture is stirred at room temperature for about 24 hours, then is poured carefully into approximately 900 parts by volume of cold dilute hydrochloric acid, resulting in separation of a gummy product. The aqueous layer is decanted and extracted with ethyl acetate and the gum is extracted also into ethyl acetate. The ethyl acetate extracts are combined, washed successively with dilute hydrochloric acid, water and dilute aqueous sodium chloride, then dried over anhydrous magnesium sulfate and concentrated to a small volume under reduced pressure. Hexane is added to the concentrated solution, resulting in separation of a gummy precipitate, which is dried under reduced pressure, then purified by countercurrent distribution between methanol:water:chloroform:carbon tetrachloride (37:10:26:27) to yield pure N tertiary-butoxycarbonyl-L-methionyl-L-α-aspartyltryptamide, melting with decomposition at about 70°–90°. It is characterized further by an optical rotation, in dimethylformamide, of −18°.

EXAMPLE 2

When the procedure of Example 1 is repeated, using 23.6 parts of N-tertiary-butoxycarbonyl-L-methionyl 2,4,5-trichlorophen ester, 12 parts of L-α-aspartyl-DL-1'-methyl-2-furylethylamide, 100 parts by volume of dimethylformamide and 8.1 parts by volume of N-methylmorpholine, there is obtained N-tertiary-butoxycarbonyl-L-methionyl-L-α-aspartyl-DL-1'-methyl-2-furylethylamide, melting at about 94°–106° and exhibiting, in dimethylformamide, an optical rotation of −28°.

EXAMPLE 3

The reaction of 32.3 parts of N-(tertiary-butoxycarbonyl)-L-methionine 2,4,5-trichlorophenyl ester, 19.3 parts of L-α-aspartyl-DL-methylhexylamide, 180 parts by volume of dimethylformamide and 9.4 parts by volume of N-methylmorpholine according to the procedure described in Example 1 affords N-(tertiary-butoxycarbonyl)-L-methionyl-L-aspartyl-DL-methylhexylamine, melting at about 82° and exhibiting an optical rotation, in dimethylformamide, of −30°.

EXAMPLE 4

When 34.6 parts of N-(tertiary-butoxycarbonyl)-L-methionine 2,4,5-trichlorophenyl ester, 20.9 parts of L-α-aspartyl-DL-1,4-dimethylpentylamide, 250 parts by volume of dimethylformamide and 20 parts by volume of N-methylmorpholine are allowed to react according to the procedure described in Example 1, there is produced N-(tertiary-butoxycarbonyl)-L-methionyl-L-α-aspartyl-DL-1,4-dimethylpentylamide, melting at about 95°–96° and exhibiting, in dimethylformamide, an optical rotation of −28°.

EXAMPLE 5

The reaction of 26.3 parts of N-(tertiary-butoxycarbonyl)-L-methionine 2,4,5-trichlorophenyl ester, 14.8 parts of L-α-aspartyl-DL-2'-phenylcyclopropylamide, 200 parts by volume of dimethylformamide and 6.9 parts by volume of N-methylmorpholine according to the procedure of Example 1 affords N-(tertiary-butoxycarbonyl)-L-methionyl-L-α-aspartyl-DL-2'-phenylcyclopropylamide, which melts at about 76°–78° and displays an optical rotation, in dimethylformamide, of −25°.

EXAMPLE 6

By the reaction of 8.15 parts of N-(tertiary-butoxycarbonyl)-L-methionine 2,4,5-trichlorophenyl ester, 6.53 parts of L-α-aspartyl-2-indanylamide, 130 parts by volume of dimethylformamide and 6 parts by volume of N-methylmorpholine according to the procedure of Example 1, there is obtained N-(tertiary-butoxycarbonyl)-L-methionyl-L-α-aspartyl-L-indanylamide, melting at about 149°–151° and displaying an optical rotation, in dimethylformamide, of −14°.

EXAMPLE 7

The reaction of 23.6 parts of N-(tertiary-butoxycarbonyl)-L-methionine 2,4,5-trichlorophenyl ester, 13.4 parts of L-α-aspartyl-DL-1-methyl-4'-fluorophenethylamide, 125 parts by volume of dimethylformamide and 11.5 parts by volume of N-methylmorpholine according to the procedure of Example 1 results in N-(tertiary-butoxycarbonyl)-L-methionyl-L-α-aspartyl-DL-1-methyl-4'-fluorophenethylamide, which compound melts with decomposition at about 83°–88° and is characterized further by an optical rotation, in dimethylformamide, of −31°.

EXAMPLE 8

When 19.3 parts of N-(tertiary-butoxycarbonyl)-L-methionine 2,4,5-trichlorophenyl ester, 12.5 parts of L-α-aspartyl-L-1-methylphenethylamide, 195 parts by volume of dimethylformamide and 5.6 parts by volume of N-methylmorpholine are allowed to react according to the procedure of Example 1, there is produced N-(tertiary-butoxycarbonyl)-L-methionyl-L-α-aspartyl-L-1-methylphenethylamide, melting with decomposition at about 70° and displaying an optical rotation, in dimethylformamide, of −4°.

EXAMPLE 9

The reaction of 23.6 parts of N-(tertiary-butoxycarbonyl)-L-methionine 2,4,5-trichlorophenyl ester, 13.3 parts of L-α-aspartyl-DL-1-methylphenoxyethylamide, 125 parts by volume of dimethylformamide and 11.5 parts by volume of N-methylmorpholine according to the procedure of Example 1 affords N-(tertiary-butoxycarbonyl)-L-methionyl-L-α-aspartyl-DL-1-methylphenoxyethylamide, melting at about 89°–91° and displaying an optical rotation, in dimethylformamide, of −30°.

EXAMPLE 10

The reaction of 47.2 parts of N-(tertiary-butoxycarbonyl)-L-methionine 2,4,5-trichlorophenyl ester, 25.6 parts of L-α-aspartyl-L-1-methylcyclohexylethylamide, 250 parts by volume of dimethylformamide and 22.3 parts by volume of N-methylmorpholine according to the procedure described in Example 1 results in N-(tertiary-butoxycarbonyl)-L-methionyl-L-α-aspartyl-L-1-methylcyclohexylethylamine, which melts at about 101°–103° and displays an optical rotation, in dimethylformamide, of −41°.

EXAMPLE 11

When 21.4 parts of N-(tertiary-butoxycarbonyl)-L-methionine 2,4,5-trichlorophenyl ester, 11.5 parts of L-α-aspartyl-1,1-dimethylphenethylamide, 85 parts by volume of dimethylformamide and 10.2 parts by volume of N-methylmorpholine are allowed to react according to the procedure described in Example 1, there is obtained N-(tertiary-butoxycarbonyl)-L-methionyl-L-α-aspartyl-1,1-dimethylphenethylamide, melting with decomposition at about 96°–100° and displaying an optical rotation, in dimethylformamide, of −27°.

EXAMPLE 12

The reaction of 14.2 parts of N-(tertiary-butoxycarbonyl)-L-methionine 2,4,5-trichlorophenyl ester, 9.31 parts of L-α-aspartyl-DL-2-phenyl-3-methylmorpholide, 75 parts by volume of dimethylformamide and 3.4 parts by volume of N-methylmorpholine according to the procedure described in Example 1 yields N-(tertiary-butoxycarbonyl)-L-methionyl-L-α-aspartyl-DL-2-phenyl-3-methylmorpholide.

EXAMPLE 13

A solution consisting of 10.6 parts of N-(tertiary-butoxycarbonyl)-L-methionyl-L-α-aspartyltryptamide and 61 parts by volume of 1:1 trifluoroacetic acid:acetic acid is stirred at room temperature for about 5 hours, then is concentrated under reduced pressure to afford an oily residue. That material is extracted into methanol and the methanol solution is decolorized with activated carbon, then is treated with approximately 300 parts by volume of cold ether to effect precipitation of the product. The precipitated product is dried to afford L-methionyl-L-α-aspartyltryptamide trifluoroacetate, which compound is characterized by an optical rotation, in dimethylformamide, of +3°.

EXAMPLE 14

A solution of 2.5 parts of N-(tertiary-butoxycarbonyl)-L-methionyl-L-α-aspartyl-DL-1-methyl-4'-fluorophenethylamide in 17 parts by volume of glacial acetic acid is treated with 8 parts by volume of a 6 N hydrogen chloride in dioxane solution and the mixture is stirred at room temperature for about 20 minutes. The solvents are removed by distillation under reduced pressure and the oily residue is triturated with ether to afford the solid product, which is isolated by filtration, washed on the filter with ether and dried under reduced pressure, thus producing L-methionyl-L-α-aspartyl-DL-1-methyl-4'-fluorophenethylamide hydrochloride hemihydrate, melting with decomposition at about 170°–173° and displaying, in dimethylformamide, an optical rotation of +3°.

EXAMPLE 15

The reaction of 2.71 parts of N-(tertiary-butoxycarbonyl)-L-methionyl-L-α-aspartyl-DL-1-methylphenoxyethylamide, 17 parts by volume of acetic acid and 8 parts by volume of 6 N hydrogen chloride in dioxane according to the procedure described in Example 14 results in L-methionyl-L-α-aspartyl-DL-1-methylphenoxyethylamide hydrochloride tetartohydrate, melting at about 161°–165° and exhibiting an optical rotation, in methanol, of 0°.

EXAMPLE 16

When 4.96 parts of N-(tertiary-butoxycarbonyl)-L-methionyl-L-α-aspartyl-1,1-dimethylphenethylamide is allowed to react with 34 parts by volume of acetic acid and 16 parts by volume of 6 N hydrogen chloride in dioxane according to the procedure of Example 14, there is produced L-methionyl-L-α-aspartyl-1,1-dimethylphenethylamide hydrochloride. That salt is dissolved in aqueous methanol and the resulting solution is acidified to pH 6.5, resulting in precipitation of the free amino acid. The precipitate is isolated by filtration, washed with water and dried under reduced pressure to afford L-methionyl-L-α-aspartyl-1,1-dimethylphenethylamide hemihydrate, displaying an optical rotation, in dimethylformamide, of −134°.

EXAMPLE 17

A solution consisting of 7.11 parts of N-(tertiary-butoxycarbonyl)-L-methionyl-L-α-aspartyl-2-indanylamide in 40 parts by volume of 80% aqueous trifluoroacetic acid is stirred at room temperature for about 3 hours, then is concentrated to dryness under reduced pressure to afford an oily residue. That material is purified by countercurrent distribution using chloroform:carbon tetrachloride:methanol:water (26:27:37:10), thus affording L-methionyl-L-α-aspartyl-2-indanylamide hemihydrate, melting with decomposition at about 188°–189.5° and displaying an optical rotation, in acetic acid, of +14°.

EXAMPLE 18

The reaction of 9.24 parts of N-(tertiary-butoxycarbonyl)-L-methionyl-L-α-aspartyl-DL-1-methylhexylamide and 60 parts by volume of 80% aqueous trifluoroacetic acid according to the procedure described in Example 17 results in L-methionyl-L-α-aspartyl-DL-1-methylhexylamide tetrahydrate, melting at about 183°–184.5° and exhibiting an optical rotation, in acetic acid, of +3°.

EXAMPLE 19

The reaction of 10.1 parts of N-(tertiary-butoxycarbonyl)-L-methionyl-L-α-aspartyl-DL-1,4-dimethylpentylamide and 70 parts by volume of 80% aqueous trifluoroacetic acid according to the procedure of Example 17 results in L-methionyl-L-α-aspartyl-DL-1,4-dimethylpentylamide hydrate, melting at about 187.5°–189.5° and exhibiting an optical rotation, in acetic acid, of +5°.

EXAMPLE 20

The reaction of 13.9 parts of N-(tertiary-butoxycarbonyl)-L-methionyl-L-α-aspartyl-L-1-methylphenethylamide and 90 parts by volume of 80% aqueous trifluoroacetic acid according to the procedure of Example 17 results in L-methionyl-L-α-aspartyl-L-1-methylphenethylamide trifluoroacetate.

The latter salt is dissolved in aqueous methanol and the pH is adjusted to approximately 6.5, thus affording the precipitated amino acid, which is isolated by filtration, washed on the filter with water and dried to produce L-methionyl-L-α-aspartyl-L-1-methylphenethylamide, melting at about 210.5°–212° and displaying an optical rotation, in acetic acid, of −9°.

EXAMPLE 21

By the reaction of 33.8 parts of N-(tertiary-butoxycarbonyl)-L-methionyl-L-α-aspartyl-L-1-methylcyclohexylethylamide and 150 parts by volume of 80% aqueous trifluoroacetic acid according to the procedure described in Example 17, there is afforded, as the trifluoroacetate salt, L-methionyl-L-α-aspartyl-L-1-methylcyclohexylethylamide.

The free amino acid is prepared by dissolving the latter trifluoroacetate salt in aqueous methanol, adjusting the pH to approximately 6.5, collecting the resulting precipitated product by filtration, washing that material with water and drying it under reduced pressure to produce L-methionyl-L-α-aspartyl-L-1-methylcyclohexylethylamide, melting at about 203°–204° and exhibiting an optical rotation, in acetic acid, of −12°.

EXAMPLE 22

A solution consisting of 6.87 parts of L-methionyl-L-α-aspartyltryptamide trifluoroacetate, 7.2 parts of N-(tertiary-butoxycarbonyl)-L-tryptophane 2,4,5-trichlorophenyl ester, 3.2 parts by volume of N-methylmorpholine and 45 parts by volume of dimethylformamide is stirred for about 12–20 hours at room temperature, at the end of which time 0.5 parts by volume of dimethylaminoethylamine is added to destroy the excess active ester. After reaction mixture is stirred for about 1 hour at room temperature, 500 parts by volume of cold dilute hydrochloric acid is added, resulting in formation of a gum. The aqueous layer is decanted, then extracted with ethyl acetate and the gummy material is dissolved in those organic extracts. The ethyl acetate extracts are washed successively with dilute hydrochloric acid, water and dilute aqueous sodium chloride, then dried over anhydrous magnesium sulfate and concentrated under reduced pressure. The addition of cold hexane to the concentrated solution results in precipitation of the crude product, which is isolated by filtration, washed on the filter with hexane and dried in air. Purification of that material is effected by countercurrent distribution, using chloroform:carbon tetrachloride:methanol:water (26:27:37:10), to afford N-(tertiary-butoxycarbonyl)-L-tryptophanyl-L-methionyl-L-α-aspartyltryptamide, melting with decomposition at about 102°–120° and displaying an optical rotation, in dimethylformamide, of −20°.

EXAMPLE 23

The reaction of 5.19 parts of N-(tertiary-butoxycarbonyl)-L-tryptophane 2,4,5-trichlorophenyl ester, 3.53 parts of L-methionyl-L-aspartyl-DL-1-methylhexylamine, 25 parts by volume of dimethylformamide and 2.2 parts by volume of N-methylmorpholine according to the procedure described in Example 22 results in N-(tertiary-butoxycarbonyl)-L-tryptophanyl-L-methionyl-L-α-aspartyl-DL-1-methylhexylamide, melting at about 148°–150° and exhibiting an optical rotation, in dimethylformamide, of −28°.

EXAMPLE 24

When 14.3 parts of N-(tertiary-butoxycarbonyl)-L-tryptophane 2,4,5-trichlorophenyl ester, 10.2 parts of L-methionyl-L-α-aspartyl-DL-1,4-dimethylpentylamide, 75 parts by volume of dimethylformamide and 6 parts by volume of N-methylmorpholine are allowed to react according to the procedure of Example 22, there is produced N-(tertiary-butoxycarbonyl)-L-tryptophanyl-L-methionyl-L-α-aspartyl-DL-1,4-dimethylpentylamide, melting at about 149°–151° and displaying an optical rotation, in dimethylformamide, of −25°.

EXAMPLE 25

The reaction of 15.3 parts of N-(tertiary-butoxycarbonyl)-L-tryptophane 2,4,5-trichlorophenyl ester, 12.4 parts of L-methionyl-L-α-aspartyl-DL-2'-phenylcyclopropylamide, 60 parts by volume of dimethylformamide and 5.6 parts by volume of N-methylmorpholine are allowed to react according to the procedure of Example 22, there is obtained N-(tertiary-butoxycarbonyl)-L-tryptophanyl-L-methionyl-L-α-aspartyl-DL-2'-phenylcyclopropylamide, melting at about 179°–181° and exhibiting an optical rotation, in dimethylformamide, of −24°.

EXAMPLE 26

When 2.54 parts of N-(tertiary-butoxycarbonyl)-L-tryptophane 2,4,5-trichlorophenyl ester, 2.14 parts of L-methionyl-L-α-aspartyl-2-indanylamide, 20 parts by volume of dimethylformamide and 1.35 parts by volume of N-methylmorpholine are allowed to react according to the procedure of Example 22, there is produced N-(tertiary-butoxycarbonyl)-L-tryptophanyl-L-methionyl-L-α-aspartyl-2-indanylamide.

EXAMPLE 27

The reaction of 17.1 parts of N-(tertiary-butoxycarbonyl)-L-tryptophane 2,4,5-trichlorophenyl ester, 9.46 parts of L-methionyl-L-α-aspartyl-DL-1-methyl-4'-fluorophenethylamide and 4.8 parts by volume of N-methylmorpholine in 60 parts by volume of dimethylformamide according to the procedure described in Example 22 results in N-(tertiary-butoxycarbonyl)-L-tryptophanyl-L-methionyl-L-α-aspartyl-DL-1-methyl-4'-fluorophenethylamide hemihydrate, melting at about 160°–163° and exhibiting an optical rotation, in dimethylformamide, of −24°.

EXAMPLE 28

When 11.2 parts of N-(tertiary-butoxycarbonyl)-L-tryptophane 2,4,5-trichlorophenyl ester, 8.95 parts of L-methionyl-L-α-aspartyl-DL-1-methylphenoxyethylamide and 4.5 parts of N-methylmorpholine in 75 parts by volume of dimethylformamide are allowed to react according to the procedure described in Example 22, there is produced N-(tertiary-butoxycarbonyl)-L-tryptophanyl-L-methionyl-L-α-aspartyl-DL-1-methylphenoxyethylamide hemihydrate, melting with decomposition at about 160° and displaying an optical rotation, in dimethylformamide, of −17°.

EXAMPLE 29

The reaction of 18.9 parts of N-(tertiary-butoxycarbonyl)-L-tryptophane 2,4,5-trichlorophenyl ester, 13.8 parts of L-methionyl-L-α-aspartyl-L-1-methylcyclohexylethylamide, 8.3 parts of N-methylmorpholine and 90 parts by volume of dimethylformamide according to the procedure described in Example 22 results in N-(tertiary-butoxycarbonyl)-L-tryptophanyl-L-methionyl-L-α-aspartyl-L-1-methylcyclohexylethylamide tetartohydrate, melting at about 161°–163° and displaying an optical rotation, in dimethylformamide, of −35°.

EXAMPLE 30

When 7.82 parts of N-(tertiary-butoxycarbonyl)-L-tryptophane 2,4,5-trichlorophenyl ester, 6.07 parts of L-methionyl-L-α-aspartyl-1,1-dimethylphenethylamide, 3.2 parts by volume of N-methylmorpholine and 50 parts by volume of dimethylformamide are allowed to react according to the procedure of Example 22, there is produced N-(tertiary-butoxycarbonyl)-L-tryptophanyl-L-methionyl-L-α-aspartyl-1,1-dimethylphenethylamide, which exhibits an optical rotation, in dimethylformamide, of −26°.

EXAMPLE 31

The reaction of 7.95 parts of N-(tertiary-butoxycarbonyl)-L-tryptophane 2,4,5-trichlorophenyl ester, 6.9 parts of L-methionyl-L-α-aspartyl-L-1-methylphenethylamide, 2.1 parts by volume of N-methylmorpholine and 50 parts by volume of dimethylformamide according to the procedure of Example 22 results in, after separation by countercurrent distribution between chloroform:carbon tetrachloride:methanol:water (26:27:37:10), N-(tertiary-butoxycarbonyl)-L-tryptophanyl-L-methionyl-L-α-aspartyl-L-1-methylphenethylamide, melting at about 172.5°–174.5° and exhibiting an optical rotation, in dimethylformamide, of −36°, and also N-(tertiary-butoxycarbonyl)-D-tryptophanyl-L-methionyl-L-α-aspartyl-L-1-methylphenethylamide, melting at about 159.5°–162.5° and displaying an optical rotation, in dimethylformamide, of −27°.

EXAMPLE 32

A solution of 7.9 parts of N-(tertiary-butoxycarbonyl)-L-tryptophanyl-L-methionyl-L-α-aspartyl-DL-1-methylhexylamide in 37 parts by volume of 80% aqueous trifluoroacetic acid is stirred at room temperature for about 3½ hours, at the end of which time the excess acid is removed by distillation under reduced pressure. Dilution of the concentrated mixture with water affords a solid, which is suspended in water and the pH is adjusted, by the addition of aqueous sodium hydroxide, to pH 7. The resulting product is isolated by filtration, washed on the filter with water and purified by recrystallization from aqueous isopropyl alcohol to yield L-tryptophanyl-L-methionyl-L-α-aspartyl-DL-1-methylhexylamide, melting at about 208.5°–210.5° with decomposition. It exhibits an optical rotation, in acetic acid, of 0°.

EXAMPLE 33

The reaction of 9.67 parts of N-(tertiary-butoxycarbonyl)-L-tryptophanyl-L-methionyl-L-α-aspartyl-DL-1,4-dimethylpentylamide in 45 parts of 80% aqueous trifluoroacetic acid according to the procedure described in Example 32 results in L-tryptophanyl-L-methionyl-L-α-aspartyl-DL-1,4-dimethylpentylamide, which exhibits an optical rotation, in dimethylformamide, of −11° and, in acetic acid, of −0.5°.

EXAMPLE 34

When 1.54 parts of N-(tertiary-butoxycarbonyl)-L-tryptophanyl-L-methionyl-L-α-aspartyl-2-indanylamide is allowed to react with 7 parts by volume of 80% aqueous trifluoroacetic acid according to the procedure of Example 32, there is produced L-tryptophanyl-L-methionyl-L-α-aspartyl-2-indanylamide, melting at about 207°–209° and displaying an optical rotation, in dimethylformamide, of −2°.

EXAMPLE 35

When 11.2 parts of N-(tertiary-butoxycarbonyl)-L-tryptophanyl-L-methionyl-L-α-aspartyl-DL-2′-phenylcyclopropylamide is reacted with 50 parts by volume of 80% aqueous trifluoroacetic acid according to the procedure described in Example 32, there is obtained L-tryptophanyl-L-methionyl-L-α-aspartyl-DL-2′-phenylcyclopropylamide hemihydrate, characterized by an optical rotation, in dimethylformamide, of −29° and, in acetic acid, of +3°.

EXAMPLE 36

The reaction of 2.33 parts of N-(tertiary-butoxycarbonyl)-L-tryptophanyl-L-methionyl-L-α-aspartyl-L-1-methylphenethylamide with 11 parts by volume of 80% aqueous trifluoroacetic acid according to the procedure described in Example 32 results in L-tryptophanyl-L-methionyl-L-α-aspartyl-L-1-methylphenethylamide, which exhibits an optical rotation, in dimethylformamide, of −37° and, in acetic acid, of −13°.

EXAMPLE 37

When 3.25 parts of N-(tertiary-butoxycarbonyl)-L-tryptophanyl-L-methionyl-L-α-aspartyltryptamide is allowed to react with 14.5 parts by volume of a mixture consisting of 1:1 trifluoroacetic acid:acetic acid and the reaction is conducted for about 5 hours and the product is isolated according to the procedure of Example 32, there is obtained L-tryptophanyl-L-methionyl-L-α-aspartyltryptamide hemihydrate, which melts at about 192°–196° and displays an optical rotation, in dimethylformamide, of −20°.

EXAMPLE 38

To a solution of 3.47 parts of N-(tertiary-butoxycarbonyl)-L-tryptophanyl-L-methionyl-L-α-aspartyl-DL-1-methyl-4′-fluorophenethylamide in 17 parts by volume of acetic acid is added, with stirring, 8 parts by volume of 6.3 N hydrogen chloride in dioxane and that mixture is stirred for about 45 minutes at room temperature. The solvents are then removed by distillation under reduced pressure and the oily residue is triturated with anhydrous ether. The resulting solid is isolated by filtration, washed with ether and dried under reduced pressure to afford the product as the amine hydrochloride. That material is then dissolved in 20 parts by volume of methanol containing 5 parts by volume of 1 N aqueous sodium hydroxide and the resulting precipitate is isolated by filtration, washed with water and dried to afford L-tryptophanyl-L-methionyl-L-α-aspartyl-DL-1-methyl-4′-fluorophenethylamide, containing three-fourths of a mole of water. This compound melts at about 215° and displays an optical rotation, in dimethylformamide, of −21°.

EXAMPLE 39

When 2.56 parts of N-(tertiary-butoxycarbonyl)-L-tryptophanyl-L-methionyl-L-α-aspartyl-DL-1-methylphenoxyethylamide is allowed to react with 12.5 parts by volume of acetic acid and 6 parts by volume of 6 N hydrogen chloride in dioxane according to the procedure described in Example 38, there is produced L-tryptophanyl-L-methionyl-L-α-aspartyl-DL-1-methylphenoxyethylamide, characterized by an optical rotation, in dimethylformamide, of −22°.

EXAMPLE 40

When 2.48 parts of N-(tertiary-butoxycarbonyl)-L-tryptophanyl-L-methionyl-L-α-aspartyl-1,1-dimethylphenethylamide, 12 parts by volume of acetic acid and 6 parts by volume of 6 N hydrogen chloride in dioxane are allowed to react according to the procedure described in Example 38, there is obtained L-tryptophanyl-L-methionyl-L-α-aspartyl-1,1-dimethyl-phenethylamide, characterized by a melting point of about 160°–162° and displaying an optical rotation, in dimethylformamide, of −28°.

EXAMPLE 41

The reaction of 3.22 parts of N-(tertiary-butoxycarbonyl)-L-tryptophanyl-L-methionyl-L-α-aspartyl-L-1-methylcyclohexylethylamide with 16 parts of volume of acetic acid and 8 parts by volume of 6 N hydrogen chloride in dioxane according to the procedure described in Example 38 affords L-tyroptophanyl-L-methionyl-L-α-aspartyl-L-1-methylcyclohexylethylamide hydrochloride hydrate, characterized by an optical rotation, in methanol, of −18°.

What is claimed is:

1. A compound of the formula

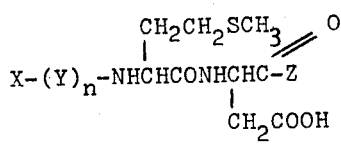

wherein X is hydrogen or a tertiary-butoxycarbonyl radical, Y is a tryptophanyl radical, $n$ is 0 or 1 and Z is an amine residue wherein the amine is an alkyl amine, cycloalkyl amine, heterocyclic amine or aralkyl amine.

2. As in claim 1, the compound which is N-tertiary-butoxycarbonyl-L-tryptophanyl-L-methionyl-L-α-aspartyl-DL-2'-phenylcyclopropylamide.

3. The compound N-tertiary-butoxycarbonyl-L-methionyl-L-α-aspartyl-DL-1-methylphenoxyethylamide.

4. The compound N-tertiary-butoxycarbonyl-L-tryptophanyl-L-methionyl-L-α-aspartyl-DL-1-methyl-4'-fluorophenethylamide.

5. The compound N-tertiary-butoxycarbonyl-L-tryptophanyl-L-methionyl-L-α-aspartyl-DL-1-methyl-phenoxyethylamide.

6. The compound L-tryptophanyl-L-methionyl-L-α-aspartyl-DL-1-methyl-4'-fluorophenethylamide.

7. The compound L-tryptophanyl-L-methionyl-L-α-aspartyl-DL-1-methylphenoxyethylamide.

8. As in claim 1, the compound which is N-tertiary-butoxycarbonyl-L-tryptophanyl-L-methionyl-L-α-aspartyl-DL-1-methylhexylamide.

9. As in claim 1, the compound which is N-tertiary-butoxycarbonyl-L-methionyl-L-α-aspartyl-2-indanylamide.

10. As in claim 1, the compound which is N-tertiary-butoxycarbonyl-D-tryptophanyl-L-methionyl-L-α-aspartyl-L-1-methylphenethylamide.

11. As in claim 1, the compound which is L-tryptophanyl-L-methionyl-L-α-aspartyl-L-1-methylphenethylamide.

12. As in claim 1, the compound which is N-tertiary-butoxycarbonyl-L-tryptophanyl-L-methionyl-L-α-aspartyl-L-1-methylcyclohexylethylamide.

13. As in claim 1, the compound which is N-tertiary-butoxycarbonyl-L-tryptophanyl-L-methionyl-L-α-aspartyltryptamide.

* * * * *